(12) United States Patent
Tollini et al.

(10) Patent No.: US 12,539,397 B2
(45) Date of Patent: Feb. 3, 2026

(54) PLATFORM FOR DELIVERING SECUREMENT DEVICE

(71) Applicant: TNT Moborg International Limited, Williamsville, NY (US)

(72) Inventors: Dennis R. Tollini, Clarence Center, NY (US); Michael D. Tollini, Clarence Center, NY (US)

(73) Assignee: TNT Moborg International Limited, Williamsville, NY (US)

( * ) Notice: Subject to any disclaimer, the term of this patent is extended or adjusted under 35 U.S.C. 154(b) by 99 days.

(21) Appl. No.: 16/816,412

(22) Filed: Mar. 12, 2020

(65) Prior Publication Data

US 2021/0283374 A1  Sep. 16, 2021

(51) Int. Cl.
*A61M 25/02* (2006.01)

(52) U.S. Cl.
CPC ..... *A61M 25/02* (2013.01); *A61M 2025/0266* (2013.01); *A61M 2209/084* (2013.01); *A61M 2209/088* (2013.01)

(58) Field of Classification Search
CPC .. A61M 2025/0266; A61M 2005/1586; A61M 25/02; A61M 5/158; A61M 2209/088; A61M 2209/008; A61M 2025/028; A61M 2025/0273; A61M 2025/0246; A61M 2025/0226; A61M 2025/022; A61M 2025/0213; A61M 2025/026; A61M 25/10; A61M 3/027; A61F 13/008; A61F 13/00085; A61B 90/50; F16M 13/00; F16M 13/04; F16M 13/022
See application file for complete search history.

(56) References Cited

U.S. PATENT DOCUMENTS

| | | | | |
|---|---|---|---|---|
| 4,606,735 A * | 8/1986 | Wilder | ............... | A61M 25/02 248/205.3 |
| 4,702,736 A * | 10/1987 | Kalt | ............... | A61M 25/02 128/DIG. 26 |
| 4,838,878 A * | 6/1989 | Kalt | ............... | F16L 3/08 128/DIG. 26 |
| 6,302,867 B1 | 10/2001 | Brown, Jr. et al. | | |
| 8,500,698 B2 * | 8/2013 | Kyvik | ............... | A61M 25/02 604/179 |
| 2009/0137961 A1 * | 5/2009 | Bracken | ............... | A61M 25/02 604/179 |
| 2010/0100049 A1 * | 4/2010 | Godfrey | ............... | A61M 25/02 604/180 |
| 2012/0083743 A1 * | 4/2012 | Kyvik | ............... | A61M 25/02 604/180 |

(Continued)

*Primary Examiner* — Michael J Tsai
*Assistant Examiner* — Forrest Blake Dipert
(74) *Attorney, Agent, or Firm* — Simpson & Simpson, PLLC (57) ABSTRACT

A platform for dispensing one or more securement devices, comprising a first section, including a first top surface, a first bottom surface, a first end, and a second end, a second section connected to the first section including a second top surface and a second bottom surface, and a third section connected to the first section including a third top surface and a third bottom surface, wherein the first section is arranged to hold the one or more securement devices, and the second and third sections are arranged to be mounted to a mounting surface.

11 Claims, 5 Drawing Sheets

(56) References Cited

U.S. PATENT DOCUMENTS

| | | | |
|---|---|---|---|
| 2014/0005607 A1* | 1/2014 | Elsamahy | A61F 13/023 604/180 |
| 2015/0086741 A1* | 3/2015 | Karim | A61F 13/023 156/60 |
| 2015/0112270 A1* | 4/2015 | Smith | A61M 25/02 604/179 |
| 2016/0151607 A1* | 6/2016 | Kyvik | A61M 25/02 604/180 |
| 2016/0193452 A1* | 7/2016 | Hanson | A61F 13/025 602/52 |
| 2021/0260324 A1* | 8/2021 | Hammer | A61M 16/06 |
| 2022/0249807 A1* | 8/2022 | Sieracki | A61F 13/02 |

* cited by examiner

PLATFORM FOR DELIVERING SECUREMENT DEVICE

FIELD

The invention relates generally to securement devices, and more particularly, to a platform for delivering securement devices, and even more particularly, to a mountable platform for delivering sterilized securement devices.

BACKGROUND

Securement devices are used in the medical profession to secure needles and catheters inserted within patients to prevent dislodgement, phlebitis, damage to surrounding tissue, and the ingress of bacteria at the insertion site, and damaging surrounding tissue. Medical grade tape can be used as a securement device or to supplement a securement device. Safe and effective securement devices are particularly critical for the treatment of chronic conditions, such as kidney failure, which requires constant dialysis treatment for removing waste from a patient's blood. For patients receiving routine hemodialysis, for example, an intravenous catheter is one method that may be used to gain access to the blood. Catheter access consists of a plastic catheter with two lumens which is inserted into a large vein to allow large flows of blood to be withdrawn from one lumen, to enter the dialysis circuit, and to be returned via the other lumen. The constant site technique is being increasingly employed, where a blunted needle is inserted in exactly the same site, so as to develop "buttonhole" accesses that may be used repeatedly. However, the skin surrounding a buttonhole access is continually irritated and is susceptible to infection. Since existing securement devices are primarily opaque, healthcare providers are unable to visualize the entire insertion site. Thus, tape application, removal, and reapplication can be cumbersome.

To expedite hemodialysis, which can take hours to complete, efficient blood and dialysate flow rates are desired. To achieve optimal flow rates, needles or catheters often require adjustment, either at the onset of or at some point during treatment. Typically, to adjust a securement device, tape is removed and new tape is applied to and around the site further aggravating the skin. Healthcare providers have struggled with providing securement devices that are effective and sterile yet minimally aggravating to patients. Additionally, most medical grade tape and known securement devices require the use of "two hands" to obtain a piece (i.e., rip a piece off).

Therefore, there is a long-felt need for a platform that holds a plurality of securement devices and that is mountable and allows for "one-hand" retrieval of the securement devices. There is also a need for a platform and securement device assembly that can be sterilized.

SUMMARY

According to aspects illustrated herein, there is provided a platform for dispensing one or more securement devices, comprising a first section, including a first top surface, a first bottom surface, a first end, and a second end, a second section connected to the first section including a second top surface and a second bottom surface, and a third section connected to the first section including a third top surface and a third bottom surface, wherein the first section is arranged to hold the one or more securement devices, and the second and third sections are arranged to be mounted to a mounting surface.

According to aspects illustrated herein, there is provided a platform for dispensing one or more securement devices, comprising a first section, including a first top surface, a first bottom surface, a first end, and a second end, a second section connected to the first section, a third section connected to the first section, a fourth section connected to the second section and including a second top surface and a second bottom surface, and a fifth section connected to the third section and including a third top surface and a third bottom surface, wherein the first section is operatively arranged to hold the one or more securement devices, and the fourth and fifth sections are operatively arranged to be mounted to a mounting surface.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended 20) to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Figure 1:
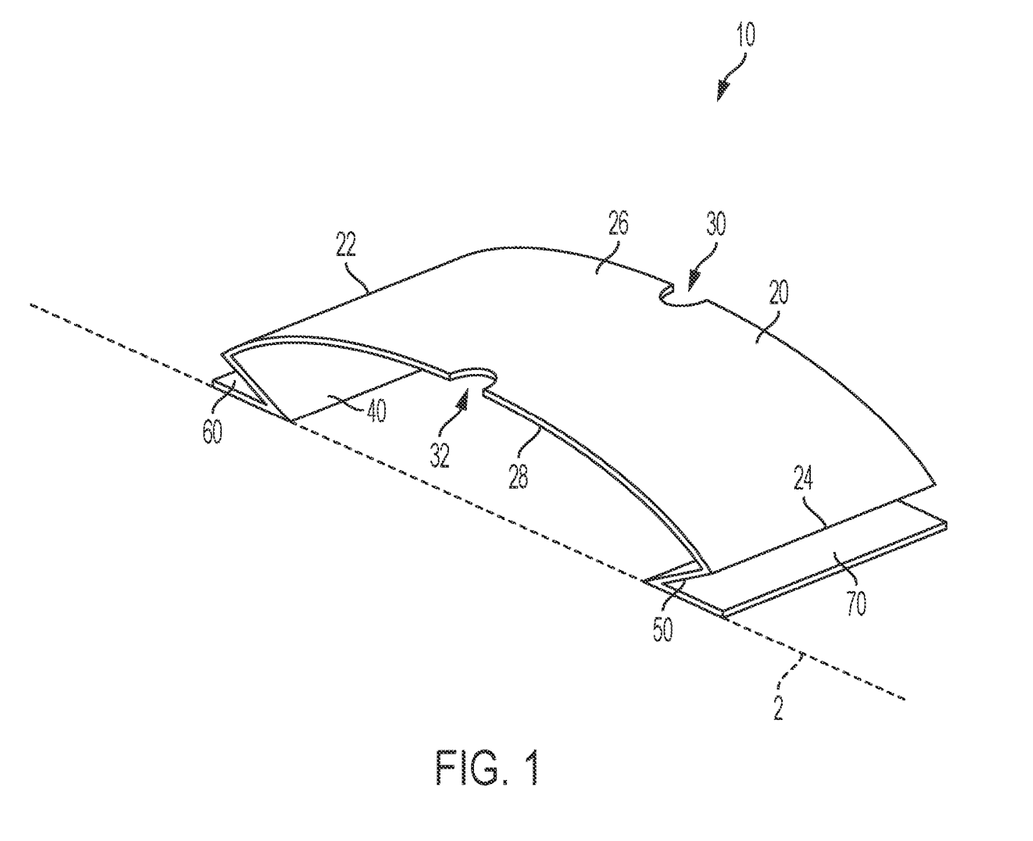
FIG. 1 is a top perspective view of a platform.

Adverting now to the figures, FIG. 1 is a top perspective view of platform 10. Platform 10 generally comprises sections 20, 40, 50, 60, and 70. As shown, platform 10 is mountable on mounting surface 2. Mounting surface 2 may be a patient's arm or body. In some embodiments, mounting surface 2 is a countertop, table, or any other suitable surface proximate the patient. Mounting surface 2 may be an uneven surface, a surfacing having a curvature, or an angled surface. Sections 40 and 50 are hingedly connected to section 20. Sections 60 and 70 are hingedly connected to sections 40 and 50, respectively.

Figure 2:
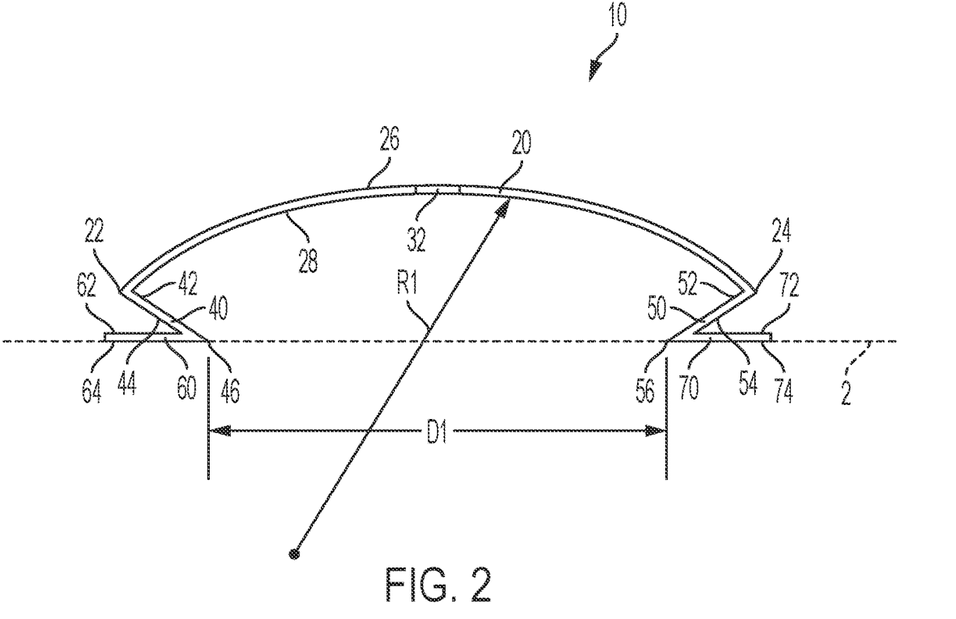
FIG. 2 is a front elevational view of the platform shown in FIG. 1, in an expanded state.
Figure 3:
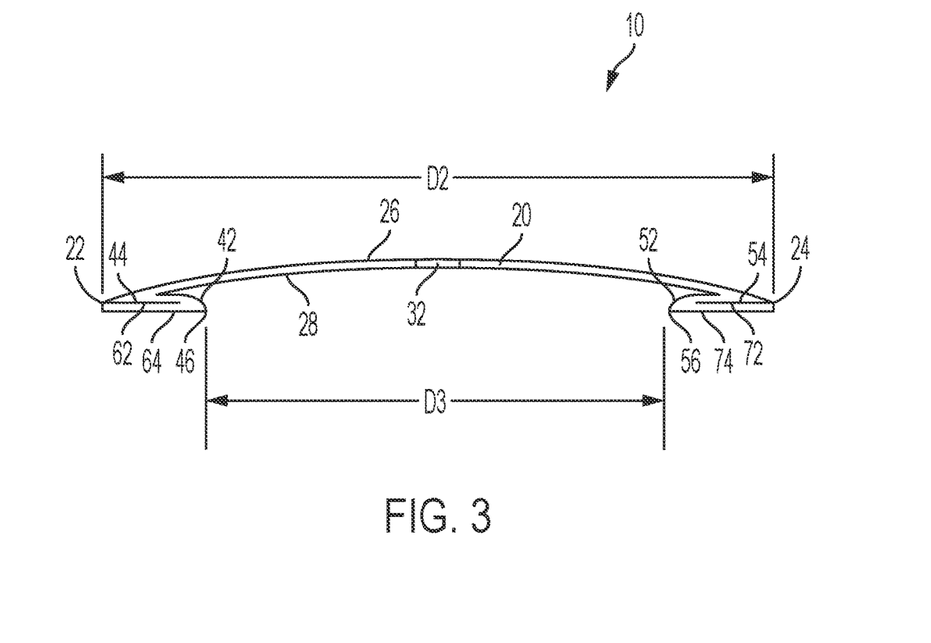
FIG. 3 is a front elevational view of the platform shown in FIG. 1, in a collapsed state.

FIG. 2 is a front elevational view of platform 10 in an expanded state. FIG. 3 is a front elevational view of platform 10 in a collapsed state. Section 20 comprises end 22, end 24, surface 26, and surface 28. In some embodiments, platform 10 comprises medical grade paper. In some embodiments, platform 10 comprises paper or another comparable material. Surface 26 is arranged such that one or more securement devices (e.g., sterilized adhesive tape) may be removably secured thereto. In some embodiments, surface 26 comprises a silicone coating. In some embodiments, surface 26 comprises a wax coating. Section 20 has a linear length of distance D2 from end 22 to end 24 (i.e., collapsed distance), as shown in FIG. 3. In some embodiments, section 20 further comprises one or more notches. As shown, section 20 comprises notch 30 and notch 32, arranged on the lateral edges of section 20. Notches 30 and 32 are operatively arranged to visually indicate a center of securement devices (see FIG. 4). Section 40 is connected to section 20 at end 22. Section 40 comprises surface 42, surface 44, and end 46. Section 50 is connected to section 20 at end 24. Section 50 comprises surface 52, surface 54, and end 56. Section 60 is connected to section 40 at end 46. Section 60 comprises surface 62 and surface 64. Section 70 is connected to section 50 at end 56. Section 70 comprises surface 72 and surface 74. As shown in FIG. 2, sections 60 and 70 are mounted to mounting surface 2 and are separated by distance D1 (i.e., mounting distance). Distance D1 is less than distance D3 (see FIG. 3). The mounting distance D1 being less than collapsed distance D3 allows section 20 to form a curvilinear shape such that securement devices can be easily removed from platform 10, as will be described in greater detail below. When platform 10 is mounted, section 20 is arranged to have radius R1. In some embodiments, surfaces 64 and 74 comprise adhesive for mounting platform 10 to mounting surface 2. Platform 10 may further comprise "peel off" covers that cover the adhesive surfaces 64 and 74 (not shown). These covers protect the adhesive surfaces from unwanted elements prior to mounting. The adhesive on surfaces 64 and 74 may be, for example, glue or epoxy. In some embodiments, surfaces 64 and 74 comprise a hypoallergenic adhesive with silicone release covers arranged thereover. In some embodiments, surfaces 64 and 74 may comprise hook and loop fastener, snaps, clamps, or another means for securing platform 10 to a surface or fixed component. The ability to mount platform 10 to mounting surface 2 allows a medical professional to operate more efficiently. For example, after a medical professional inserts a catheter or needle into a patient's arm, the medical professional can hold the catheter or needle with one hand and remove a securement device from platform 10 with the other hand, as will be described in greater detail below. It should be appreciated that mounting surface 2 may be uneven or angled such that section 60 is arranged at a higher elevational value than section 70, or vice versa. It should further be appreciated that mounting surface 2 may be stepped such that section 60 is arranged at a higher elevational value than section 70, or vice versa. In some embodiments, an additional expanding/contracting section extends from section 60 to section 70. This additional section is capable of, for example, contracting, which draws sections 60 and 70 closer together thereby creating the curvature in section 20. The additional section can then be expanded to collapse platform 10.

In the collapsed state, as shown in FIG. 3, surface 28 abuts against or is arranged proximate surfaces 42 and 52, surface 44 abuts against or is arranged proximate surface 62, and surface 54 abuts against or is arranged proximate surface 72.

In some embodiments, platform 10 is packaged in the collapsed state as shown in FIG. 3. In the collapsed state, section 20 is substantially linear.

Figure 4:
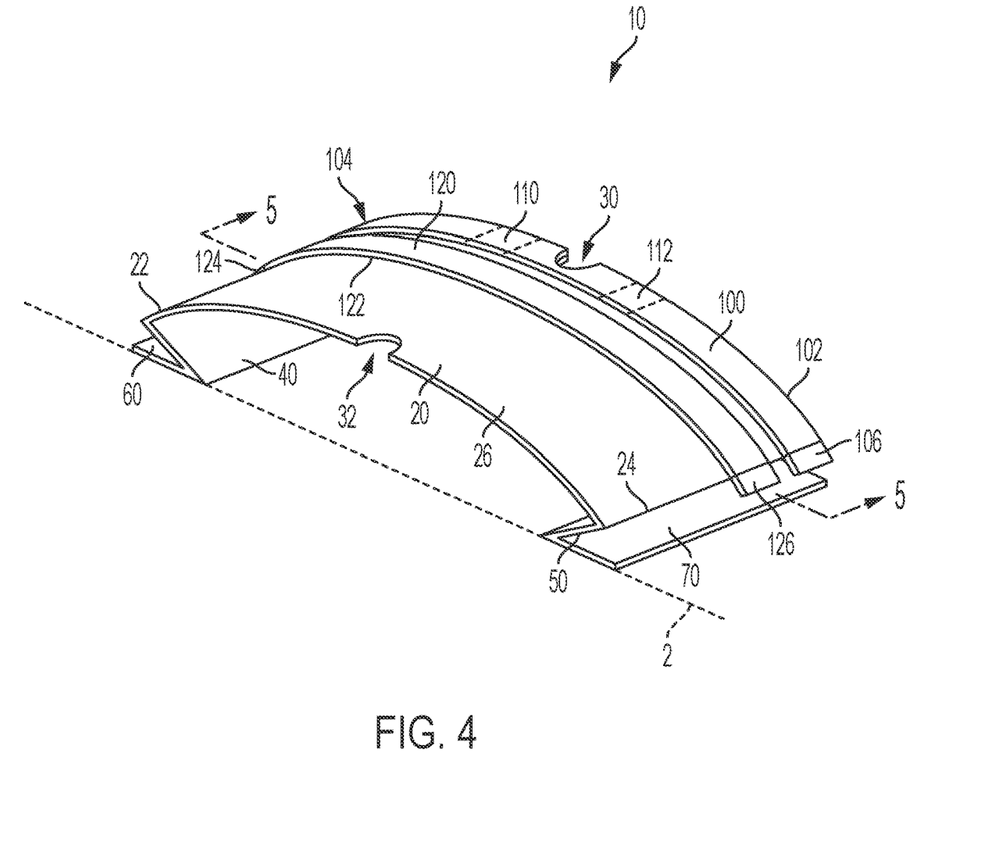
FIG. 4 is a top perspective view of the platform shown in FIG. 1, with securement devices arranged thereon.
Figure 5:
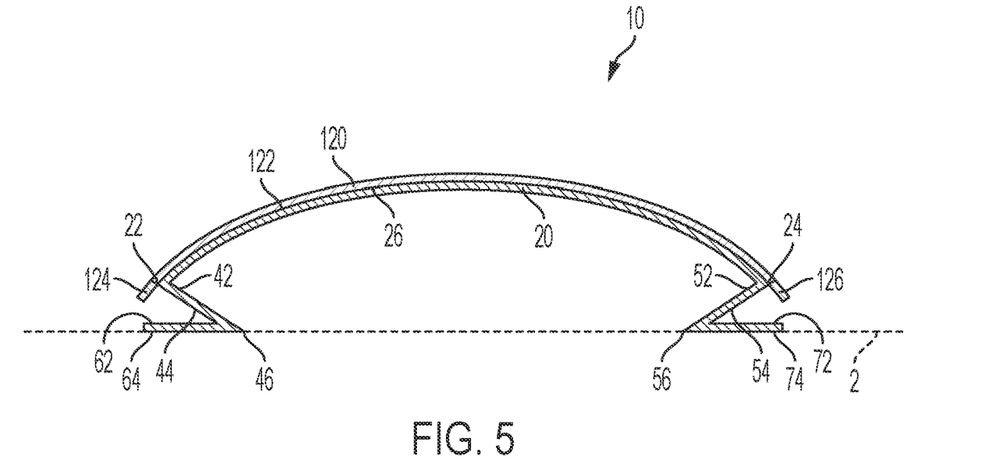
FIG. 5 is a cross-sectional view of the platform taken generally along line 5-5 in FIG. 4; and, FIGS. 6A and 6B illustrate the platform in FIG. 1 and show the respective lateral edges thereof.

FIG. 4 is a top perspective view of platform 10 with one or more securement devices, specifically, securement devices 100 and 120, arranged thereon. FIG. 5 is a cross-sectional view of platform 10 taken generally along line 5-5 in FIG. 4. Securement device 100 comprises surface 102, tab 104, and tab 106. Surface 102 comprises adhesive and is arranged to abut against surface 26. Tab 104 does not comprise adhesive and is arranged to extend at least partially beyond end 22. In some embodiments, tab 104 is created by folding the end of securement device 100 over on itself. In some embodiments, tab 104 comprises adhesive. The curvature of section 20 allows tab 104 to be suspended over mounting surface 2. Tab 106 does not comprise adhesive and is arranged to extend at least partially beyond end 24. In some embodiments, tab 106 is created by folding the end of securement device 100 over on itself. In some embodiments, tab 106 comprises adhesive. The curvature of section 20 allows tab 106 to be suspended over mounting surface 2. Because tabs 104 and 106 are suspended over mounting surface 2, a user can easily grab one of tabs 104 and 106 with one hand and peel securement device 100 from platform 10. Securement device 100 may comprise one or more non-adhesive sections, or adhesive blockers. In the embodiment shown, securement device 100 comprises non-adhesive sections 110 and 112. Securement device 120 comprises surface 122, tab 124, and tab 126. Surface 122 comprises adhesive and is arranged to abut against surface 26. Tab 124 does not comprise adhesive and is arranged to extend at least partially beyond end 22. In some embodiments, tab 124 is created by folding the end of securement device 120 over on itself. In some embodiments, tab 124 comprises adhesive. The curvature of section 20 allows tab 124 to be suspended over mounting surface 2. Tab 126 does not comprise adhesive and is arranged to extend at least partially beyond end 24. In some embodiments, tab 126 is created by folding the end of securement device 120 over on itself. In some embodiments, tab 126 comprises adhesive. The curvature of section 20 allows tab 126 to be suspended over mounting surface 2. Because tabs 124 and 126 are suspended over mounting surface 2, a user can easily grab one of tabs 124 and 126 with one hand and peel securement device 120 from platform 10. Securement device 120 may comprise one or more non-adhesive sections, or adhesive blockers. It should be appreciated that in some embodiments, instead of being curvilinear, section 20 may have one or more perforations which, in the expanded state cause section 20 to be triangular, trapezoidal, or otherwise polygonal in geometric shape. These embodiments still allow the tabs of the securement devices to be suspended over mounting surface 2, as described above.

Figure 6A:
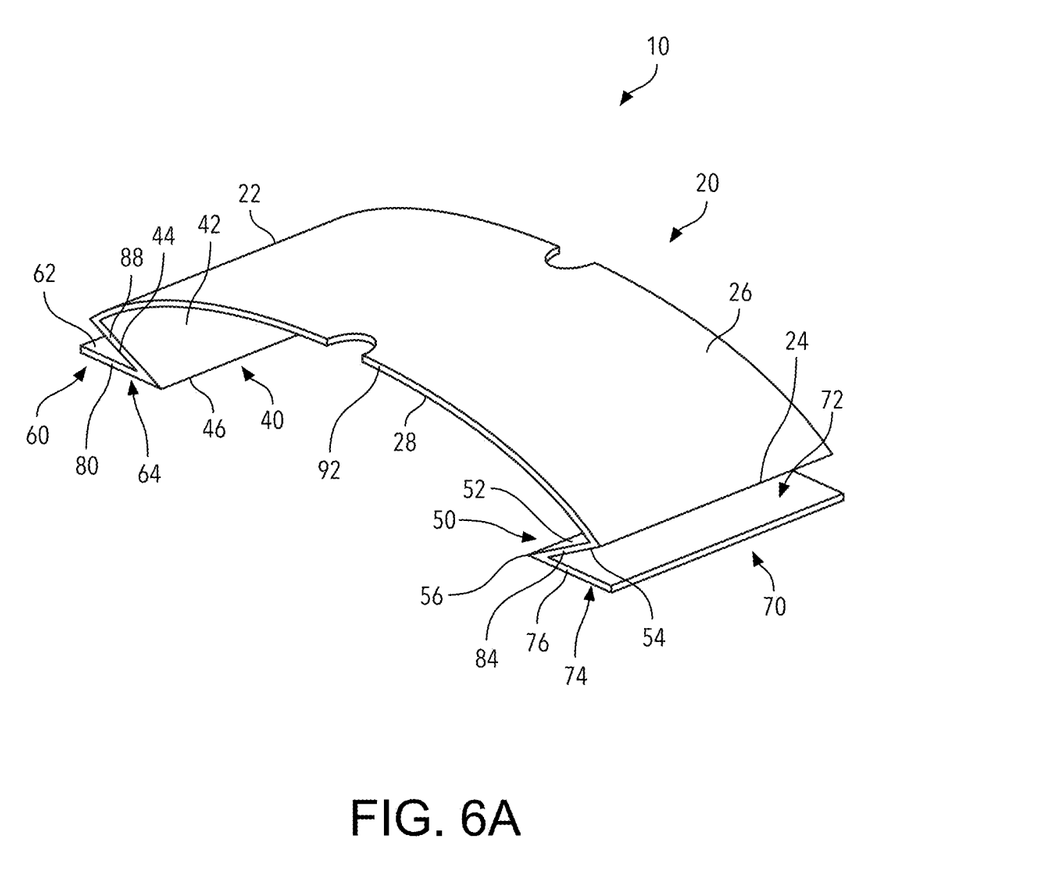
Figure 6B:
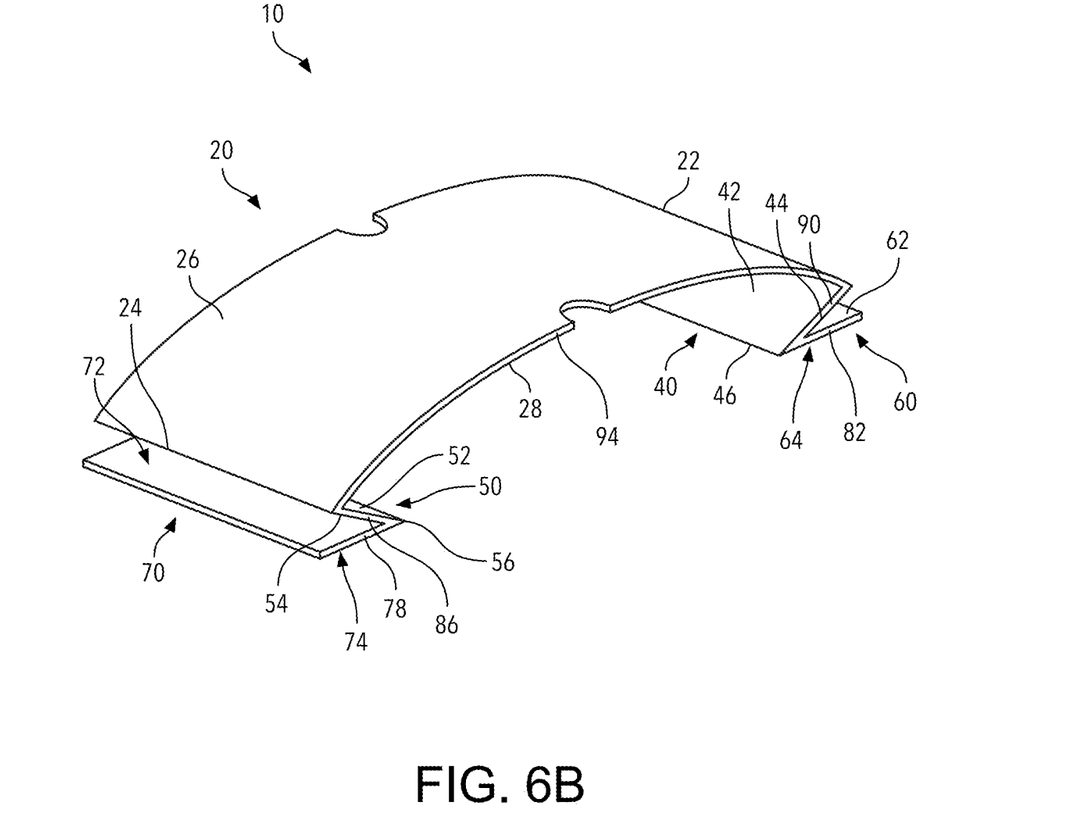

In reference to FIGS. 6A and 6B, platform 10 has a first section, e.g., section 70, having a first surface and a second surface, e.g., surfaces 72 and 74, bounded by a first hinge, e.g., and 56, a first lateral edge and a second lateral edge, e.g., lateral edges 76 and 78, the first lateral edge and the second lateral edge are arranged perpendicular to the first hinge. Platform 10 also has a second section, e.g., section 60, having a third surface and a fourth surface, e.g. surgaces 62 and 64, bounded by a second hinge, e.g., end 46, a third lateral edge and a fourth lateral edge, e.g., lateral edges 80 and 82, the third lateral edge and the fourth lateral edge are arragged perpendicular to the second hinge. Platform 10 further includes a third section, e.g., section 50 having a fifth surface, and a sixth surface, e.g., surfaces 52 and 54, bounded by a third hinge and the first hinge, e.g., ends 24 and 56, a fifth lateral edge and a sixth lateral edge, e.g., lateral edges 84 and 86, the fifth lateral edge and the sixth lateral edge are arranged perpendicular to the first hinge and the third hinge. Platform 10 additionally includes a fourth section, e.g. section 40, having a seventh surface and and eighth surface, e.g., surfaces 42 and 44, bounded by a fourth hinge and the second hinge, e.g., ends 22 and 46, a seventh lateral edge and an eighth lateral edge, e.g., lateral edges 88 and 90, the seventh lateral edge and the eighth lateral edge are arranged perpendcular to the second hinge and the fourth hinge. Still further, platform 10 includes a fifth section, e.g., section 20, having a ninth surface and a tenth surface, e.g., surfaces 26 and 28, bounded by the third and fourth hinges, e.g., ends 24 and 22, a ninth lateral edge and a tenth lateral edge, e.g., lateral edges 92 and 94, the ninth and tenth lateral edges are arranged perpendicular to the third and the fourth hinge.

It should be noted that the following description should be taken in view of all of the aforementioned illustrations and corresponding descriptions, supra.

In some embodiments of the present invention, a platform for dispensing one or more securement devices (10), i.e., platform 10, may include a first section (60), i.e., section 60, and a second section (70), i.e., section 70, the first and second sections (60, 70) arranged to be affixed to a mounting surface (2), as described supra, a third (40), i.e., section 40, and a fourth section (50), i.e., section 50, the third section (40) is connected to the first section (60) via a first hinge (46), i.e., end 46, the fourth section (50) is connected to the second section (70) via a second hinge (56), i.e., end 56, and a fifth section (20), i.e., section 20, the firth section (20) is connected to the third section (40) via a third hinge (22), i.e., end 22, the firth section (20) is connected to the fourth section (50) via a fourth hinge (24), i.e., end 24, wherein the firth section (20) is arranged to accept one or more securement devices (100, 120) thereon such that the fifth section (20) bifurcates the one or more securement devices (100, 120) and the mounting surface (2), wherein the firth section (20) is arranged to move about the hinges (56, 46, 24, 22).

It should be appreciated that every component of platform 10, including the securement devices and covers arranged thereon, is arranged to be sterilized. Platform 10 may be sterilized after assembly of each component to ensure infection does not spread to a patient. The methods for sterilizing platform 10 and its securement devices and covers include, but are not limited to, gamma ray, ethylene oxide, x-ray, and electron beam sterilization. Additionally, platform 10 is arranged to hold any securement or blood clotting device. For example, International Patent Application Publication No. WO 2017/151095 (Tollini et al.), U.S. Pat. No. 10,525, 196 (Tollini et al.), United Stated Patent Application Publication 2017/0246387 (Tollini et al.), and International Patent Application No. PCT/US2018/030163 (Tollini et al.) all disclose securement devices that could be arranged on section 20 of platform 10, which references are incorporated herein by reference in their entireties. It should be appreciated that each of the above listed references is co-owned by the inventors of the present disclosure.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

2 Mounting surface
10 Platform
20 Section
22 End
24 End
26 Surface
28 Surface
30 Notch
32 Notch
40 Section
42 Surface
44 Surface
46 End
50 Section
52 Surface
54 Surface
56 End
60 Section
62 Surface
64 Surface
70 Section
72 Surface
74 Surface
76 Lateral edge
78 Lateral edge
80 Lateral edge
82 Lateral edge
84 Lateral edge
86 Lateral edge
88 Lateral edge
90 Lateral edge
92 Lateral edge
94 Lateral edge
100 Securement device
102 Surface
104 Tab
106 Tab
110 Section
112 Section
120 Securement device
122 Surface
124 Tab
126 Tab
D1 Distance
D2 Distance
D3 Distance
R1 Radius

What is claimed is:

1. A platform for holding one or more pieces of adhesive tape, comprising:
the platform comprising:
a first section having a first surface and a second surface bounded by a first hinge, a first lateral edge, and a second lateral edge, said first lateral edge and second lateral edge are arranged perpendicular to said first hinge;
a second section having a third surface and a fourth surface bounded by a second hinge, a third lateral edge, and a fourth lateral edge, said third lateral edge and fourth lateral edge are arranged perpendicular to said second hinge;
a third section having a fifth surface and a sixth surface bounded by the first hinge, a third hinge, a fifth lateral edge, and a sixth lateral edge, said fifth lateral edge and sixth lateral edge are arranged perpendicular to said first hinge and said third hinge;
a fourth section having a seventh surface and an eighth surface bounded by the second hinge, a fourth hinge, a seventh lateral edge, and an eighth lateral edge, said seventh lateral edge and eighth lateral edge are arranged perpendicular to said second hinge and said fourth hinge;
a fifth section having a ninth surface and a tenth surface bounded by the third hinge, the fourth hinge, a ninth lateral edge, and a tenth lateral edge, said ninth lateral edge and tenth lateral edge are arranged perpendicular to said third hinge and said fourth hinge, said ninth lateral edge and tenth lateral edges have a greater length than the third hinge and fourth hinge, said fifth section having a notch arranged within said ninth lateral edge between said third hinge and said fourth hinge;
said first section having a first adhesive arranged on said second surface, said second section having a second adhesive arranged on said fourth surface; and,
a piece of adhesive tape removably secured to said ninth surface of said fifth section from said third hinge and fourth hinge and aligned with one of the ninth lateral edge and the tenth lateral edge, said piece of adhesive tape having a first end and a second end, said piece of adhesive tape having a notch disposed between said first end and said second end thereof, said notch of said adhesive tape being colinear with said notch of said fifth section, said piece of adhesive tape having at least one tab extending from at least one of said ends, said at least one tab extends past one of the third hinge or the fourth hinge, said tab being non-adhesive, said tab is configured to be created by folding the securement device about at least one of the third hinge and the fourth hinge;
wherein said notch of said fifth section indicates a center of said adhesive tape;
wherein said ninth surface of said fifth section has a coating arranged thereon, thereby allowing said adhesive tape to be removably secured thereto;
wherein said first section and said second section are arranged to be mounted to a mounting surface via said first and second adhesives, wherein when said first section is mounted to the mounting surface the third section is disposed between the first section and the fifth section such that first surface and fifth surface face each other and the sixth surface and tenth surface face each other, wherein when said second section is mounted to the mounting surface the fourth section is disposed between the second section and the fifth section such that third surface and seventh surface face each other and the eighth surface and tenth surface face each other;
wherein said at least one tab provides for one-handed removal of said piece of adhesive tape from said fifth section;
wherein the first section, second section, third section, fourth section, and fifth section are integrally formed such that all the lateral edges extend parallel to each other and the first surface, third surface, fifth surface, and ninth surface are on opposing sides of the respective first hinge, second hinge, third hinge, and fourth hinge from the respective second surface, fourth surface, sixth surface, and tenth surface.

2. The platform for holding one or more pieces of adhesive tape recited in claim 1, wherein said platform has a collapsed configuration defined by said first section and said second section having a collapsed distance.

3. The platform for holding one or more pieces of adhesive tape recited in claim 2, wherein said platform has an expanded configuration, said expanded configuration formed when said first and second adhesives are secured to said mounting surface, said expanded configuration defined by said first section and said second section having a mounting distance, wherein said mounting distance is less than said collapsed distance.

4. The platform for holding one or more pieces of adhesive tape recited in claim 1, wherein said platform has a collapsed configuration, said collapsed configuration defined by said platform being substantially linear.

5. The platform for holding one or more pieces of adhesive tape recited in claim 1, wherein said platform has an expanded configuration, said expanded configuration formed when said first and second adhesives are secured to said mounting surface, said expanded configuration defined by said platform being substantially curvilinear.

6. The platform for holding one or more pieces of adhesive tape recited in claim 1, wherein said platform has an expanded configuration and a collapsed configuration, said expanded configuration formed when said first and second adhesives are secured to said mounting surface, said expanded configuration defined by said platform being substantially curvilinear, and said collapsed configuration defined by said platform being substantially linear.

7. The platform for holding one or more pieces of adhesive tape recited in claim 1, wherein said coating of said ninth surface of said fifth section comprises at least one of: a silicone coating; and, a wax coating.

8. The platform for holding one or more pieces of adhesive tape recited in claim 1, wherein said fifth section further comprises a second notch arranged within said tenth lateral edge and centered between said third hinge and said fourth hinge.

9. The platform for holding one or more pieces of adhesive tape recited in claim 8 further comprising: a second piece of adhesive tape removably secured to said ninth surface of said fifth section, said second piece of adhesive tape having a first end and a second end, said second piece of adhesive tape having a notch disposed between said first end and said second end thereof, said notch of said second adhesive tape being colinear with said second notch of said fifth section.

10. The platform for holding one or more pieces of adhesive tape recited in claim 1 further comprising: a notch-less piece of adhesive tape removably secured to said ninth surface of said fifth section arranged proximate said piece of adhesive tape and spaced apart from said notch of said fifth section.

11. The platform for holding one or more pieces of adhesive tape recited in claim 10, wherein said notch-less piece of adhesive tape further comprises at least one tab extending from one of a pair of ends of said notch-less piece of adhesive tape, said at least one tab of said notch-less piece of adhesive tape extending past one of said third hinge and said fourth hinge, said tab of said notch-less piece of adhesive tape being non-adhesive.

\* \* \* \* \*